United States Patent [19]
Ludden et al.

[11] Patent Number: 5,101,335
[45] Date of Patent: Mar. 31, 1992

[54] DC-TO-DC CONVERTER USING COUPLED INDUCTOR CURRENT SENSING AND PREDETERMINED ON TIME

[75] Inventors: Christopher A. Ludden, Fairport; Clay A. Dunsmore, Batavia, both of N.Y.

[73] Assignee: Eastman Kodak Company, Rochester, N.Y.

[21] Appl. No.: 634,252

[22] Filed: Dec. 26, 1990

[51] Int. Cl.$^5$ .................... H02M 3/335; H05B 41/32
[52] U.S. Cl. ........................... 363/21; 363/56; 315/241 P; 354/145.1
[58] Field of Search .............. 363/18, 19, 20, 21, 363/56, 97, 131; 315/241 R, 241 S, 241 P; 320/1; 307/110; 354/145.1

[56] References Cited

U.S. PATENT DOCUMENTS

| | | | |
|---|---|---|---|
| 3,541,420 | 3/1968 | Rees | 321/2 |
| 4,025,935 | 5/1977 | Wagensonner et al. | 354/173 |
| 4,146,832 | 3/1979 | McConnell | 323/17 |
| 4,272,806 | 6/1981 | Metzger | 363/21 |
| 4,336,583 | 6/1982 | Campbell et al. | 363/21 |
| 4,367,025 | 1/1983 | Metzger | 354/145 |
| 4,430,602 | 2/1984 | Ohmori | 315/241 |
| 4,469,990 | 9/1984 | Maruyama et al. | 315/241 |
| 4,489,369 | 12/1984 | Ginsberg | 363/21 |
| 4,494,180 | 1/1985 | Streater et al. | 363/37 |
| 4,496,939 | 1/1985 | Moberg | 340/636 |
| 4,559,591 | 12/1985 | Grünsch | 363/21 |
| 4,604,567 | 8/1986 | Chetty | 323/299 |
| 4,607,320 | 8/1986 | Matui et al. | 363/21 |
| 4,612,610 | 9/1986 | Farnsworth et al. | 363/26 |
| 4,737,806 | 4/1988 | Sakaguchi et al. | 354/145.1 |
| 4,739,462 | 4/1988 | Farnsworth et al. | 363/56 |
| 4,888,821 | 12/1989 | Hamp, III et al. | 363/21 |
| 4,910,438 | 3/1990 | Farnsworth | 315/241 |
| 4,933,830 | 6/1990 | Sato et al. | 363/20 |
| 5,003,451 | 3/1991 | Gradl et al. | 363/56 |

Primary Examiner—Peter S. Wong
Attorney, Agent, or Firm—Michael J. Balconi-Lamica

[57] ABSTRACT

A DC-to-DC converter is operated in accordance with a predetermined primary circuit ON time and a sensed predetermined secondary circuit current level to provide improved charging performance and extended battery life. Energy is stored in the primary of a coupled inductor when power in the primary, provided by a battery having an internal impedance which varies over the battery's lifetime, is switched ON for a predetermined time $t_{ON}$. Upon expiration of time $t_{ON}$, power is switched OFF, whereupon stored energy is transferred to the secondary via a flyback type process, thus charging a storage capacitor. A preventing means prevents a premature switching ON of power in the primary subsequent to the expiration of time $t_{ON}$. The energy storage cycle repeats when current sensed in the secondary decreases below a predetermined minimum current threshold.

18 Claims, 3 Drawing Sheets

DC-TO-DC CONVERTER USING COUPLED INDUCTOR CURRENT SENSING AND PREDETERMINED ON TIME

BACKGROUND OF THE INVENTION

1. Field of the Invention

The invention relates to a DC-to-DC converter for charging an energy-storage capacitor. More particularly, this invention relates to a DC-to-DC converter which is operated using coupled inductor current sensing and a predetermined ON time so that optimum performance of a low-voltage DC power source and the converter in an application such as charging an electronic strobe flash unit capacitor is obtained.

2. Description of the Related Art

A basic DC-to-DC converter such as a flyback type flash charger circuit, employs a low-voltage power source, for example, a battery. In such a converter, the "load" is kept constant; whereas, the internal impedance of the battery changes over the life of the battery. This constant "load" causes poor charging performance and decreased battery life. Current thresholds in the primary and secondary circuits of the converter remain fixed over the life of the battery. As a result, mismatching of the converter "load" to the internal impedance of the battery occurs over the life of the battery.

One solution to maximize battery life and improve converter performance is found in U.S. Pat. No. 4,272,806, assigned to Eastman Kodak Company and hereby incorporated by reference. The '806 patent discloses a DC-to-DC converter circuit which dynamically varies the "load" that the converter places on the battery to maximize the life of the battery. This is accomplished by dynamically matching the converter "load" to the internal impedance of the battery over the life of the battery. In other words, minimum and maximum current threshold values in the transformer or coupled inductors are varied over the life of the battery. One disadvantage of the '806 patent device is that it employs voltage sensing on the primary side of the converter circuit and current sensing on the secondary side. This device utilizes complex control circuitry which is susceptible to noise and is therefore less reliable. In addition, the device is costly.

U.S. Pat. No. 3,541,420, granted Nov. 17, 1970, discloses a DC-to-DC converter having a variable duty cycle driver circuit. In this patent, a transistor driver circuit is connected to the primary of a transformer across whose secondary is connected a capacitor to be charged, and the duty cycle of the transistor is controlled by a current sensor connected in the secondary of the transformer. Specifically, the "ON" time of the driver circuit is fixed for supplying a predetermined amount of energy to the magnetic field of the transformer. When the driver is turned off, the magnetic field collapses, inducing current flow in the secondary of the transformer which is effective to transfer energy from the field to the capacitor. Current continues to flow in the secondary until the magnetic field collapses to zero, that is, until secondary current flow terminates. The driver circuit remains "OFF" as long as the current sensor detects the presence of load current in the secondary. As soon as secondary current terminates, a new cycle is initiated.

A disadvantage of the '420 converter is that it does not provide optimal electrical transfer efficiency. Specifically, the '420 converter requires that the secondary current decay to zero before initiating a new energy transfer cycle. In addition, the '420 converter provides no means for handling noise, induced in the primary winding circuit and the secondary winding circuit, created by the switching ON and OFF of the driver transistor.

In U.S. Pat. No. 4,336,583, issued June 22, 1982, a DC-to-DC converter is disclosed. The '583 converter includes a capacitor connected to the secondary of a transformer having a primary connected to a battery through an input control circuit. When triggered, the input control circuit connects the battery to the primary for only a predetermined time interval whereby current flows in the primary establishing a magnetic field that stores energy derived from the battery. When current in the primary is interrupted, the field collapses, inducing current flow in the secondary thereby transferring energy from the field to the capacitor. The control circuit is triggered by a voltage sensor, located in the primary circuit for monitoring the magnetic field of the transformer, that detects the collapse of the magnetic field to zero. The control circuit can also be triggered by a current sensor, located in the secondary circuit, that detects when secondary current terminates.

As with the '420 converter, the '583 converter suffers from the disadvantage that it does not provide optimal electrical transfer efficiency. Specifically, the '583 converter requires that the magnetic field of the transformer, or the secondary current, decay to zero before initiating a new energy transfer cycle. In addition, the '583 converter provides no means for handling noise, induced in the primary winding circuit and the secondary winding circuit, created by the switching ON and OFF of the driver transistor.

It would thus be desirable to provide a DC-to-DC converter that is simple, cost effective, and that provides a high degree of energy transfer efficiency. It would be further desirable to have a DC-to-DC converter which provides improved battery life and charging performance, and, in addition, high noise immunity.

SUMMARY OF THE INVENTION

To overcome the above mentioned problems in the prior art, we have invented a much simpler and lower cost DC-to-DC converter circuit which has increased reliability and decreased sensitivity to noise. The present invention also provides improved battery life and charging performance. Furthermore, the converter circuit of the present invention achieves a high degree of energy transfer efficiency.

A DC-to-DC converter, according to the invention, comprises a coupled inductor means having a primary circuit means and a secondary circuit means and is adapted to be energized by a battery. Energy is stored in the primary circuit means when a controlling means activates a switching means to provide power in the primary circuit means for a predetermined time $t_{ON}$. Upon expiration of time $t_{ON}$, the controlling means deactivates the switching means, whereupon the stored energy is transferred to the secondary circuit means, thus charging a storage capacitor. A current sensing means senses current in the secondary circuit and provides an output signal having a first condition when current in the secondary circuit decreases below a predetermined level, $I_{MIN}$, and a second condition when current in the secondary circuit is above the predetermined level. The energy storage cycle repeats when current sensed in the secondary circuit decreases below $I_{MIN}$. Furthermore, the controlling means comprises a preventing means for preventing a premature activation of the switching means subsequent to expiration of the predetermined time, $t_{ON}$. The present invention thus provides simplified control circuitry having improved reliability and greater noise immunity than that taught in the prior art.

DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which like reference numerals are carried forward, and in which:

DESCRIPTION OF THE PREFERRED EMBODIMENT

Because battery-powered DC-to-DC converters of the "flyback" type are well known in the art, the present description will be directed in particular to elements forming part of, or cooperating directly with, the invention. It is to be understood, however, that other elements not specifically shown or described may take various forms known to persons of ordinary skill in the DC-to-DC converter art.

Figure 1:
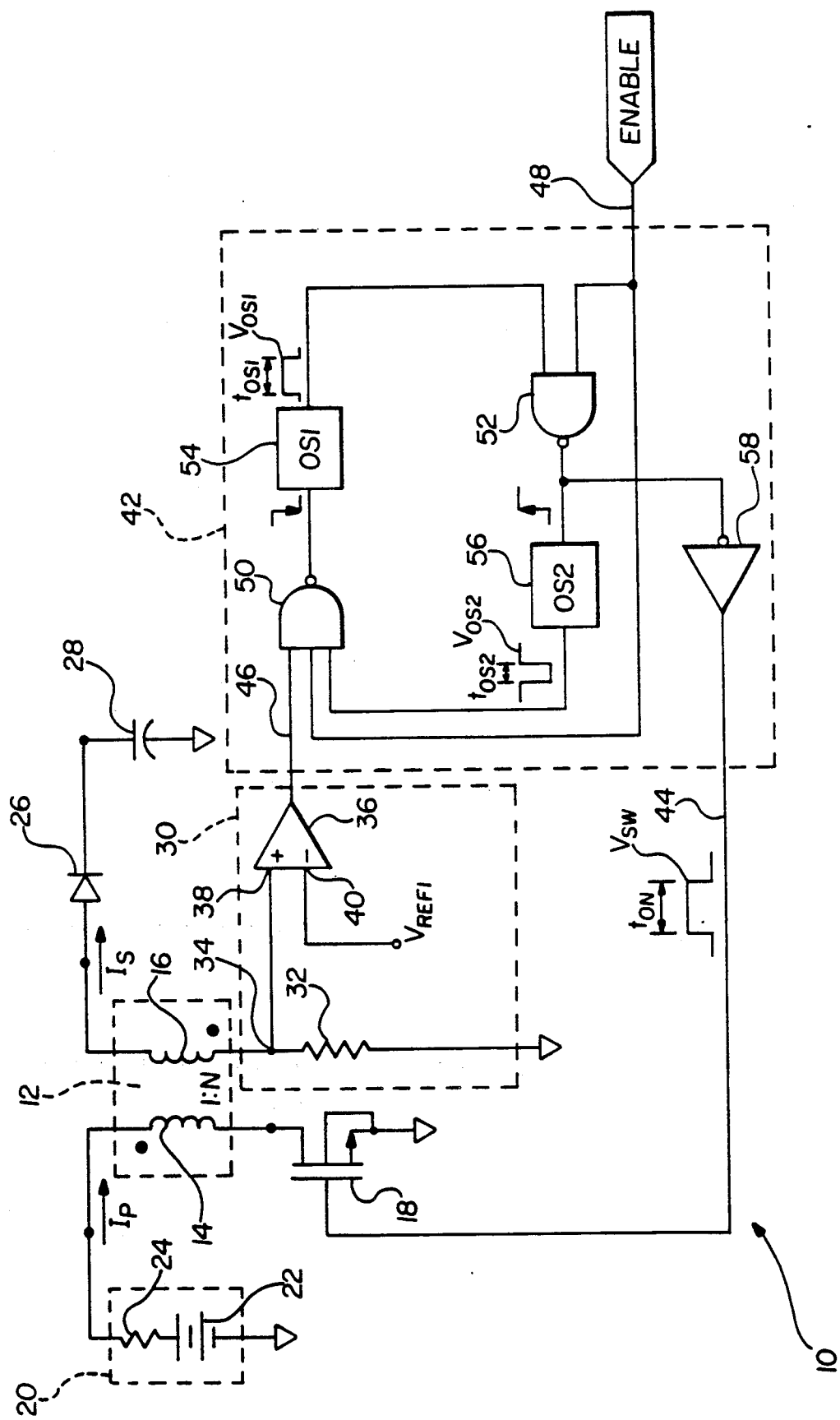
FIG. 1 is a circuit diagram of a DC-to-DC converter according a preferred embodiment of the invention.

Referring now to FIG. 1, a DC-to-DC converter 10 of the type known in the art as a "flyback" converter is shown. The DC-to-DC converter comprises a coupled inductor 12 having oppositely wound primary and secondary windings, 14 and 16, respectively. A switching means 18 is connected in series with the primary winding 14 and a low-voltage battery 20. Switching means 18 can comprise for example a MOSFET power switching transistor or an equivalent. Battery 20 is shown as having an open-circuit voltage 22 and an effective internal impedance, identified by numeral 24, wherein the effective internal impedance 24 may vary throughout battery life. A diode 26 is connected in series to the secondary winding 16 and storage capacitor 28, for rectifying charging current to charge capacitor 28. Storage capacitor 28 represents a high-voltage capacitive load.

The flyback converter 10 is constructed and arranged to charge the capacitor 28 to a maximum voltage of approximately 330 volts from the low-voltage battery 20, which may have a maximum open-circuit voltage 22 of approximately 6 volts.

A current sensing means 30 is connected in series with the secondary winding 16 to monitor secondary winding current $I_S$. Current sensing means 30 outputs a logic "0" (LO) or "1" (HI) signal, indicative of secondary winding current $I_S$ being above or below a predetermined minimum threshold current, $I_{MIN}$, respectively. The value of $I_{MIN}$ is selected to provide and achieve optimum performance of the DC-to-DC converter for the requirements of a particular application (e.g., a flyback type self-oscillating flash charger). In particular, the current level $I_{MIN}$ is selected to be different from a zero current level. A non-zero value of $I_{MIN}$ results in improved charge transfer rates, as well as, improved energy transfer efficiency. A discussion of the effects of a non-zero $I_{MIN}$ relating to charge transfer rates and energy transfer efficiency is found in commonly assigned U.S. Pat. No. 4,272,806.

Current sensing means 30 comprises resistor 32 connected in series with secondary winding 16 at node 34. Current sensing means 30 further comprises a comparator 36, wherein a non-inverting input 38 of comparator 36 is connected at node 34. An inverting input 40 of comparator 36 is connected to a reference volta $V_{REF1}$. The output of comparator 36 is the output of current sensing means 30.

A controlling means 42 comprises an output 44, and two inputs, 46 and 48. Output 44 connects to switching means 18 to energize switching means 18 ON/OFF. An ON/OFF signal $V_{SW}$ on output 44 causes switching means 18 to enable/disable, respectively, current $I_P$ to flow in primary winding 14. Input 46 connects to current sensing means 30 to receive the current sensing means 30 output signal which is indicative of the secondary current level. Lastly, input 48 receives a converter charge enable/disable signal.

Controlling means 42 further comprises two logic NAND gates, 50 and 52, respectively, two one-shot multivibrators, 54 and 56, respectively, and an inverting buffer 58. NAND gate 50 comprises a three input NAND gate. A first input of NAND gate 50 is input 46. A second input of NAND gate 50 is connected to converter charge enable/disable input 48. The output of NAND gate 50 is connected to a trigger input of one-shot 54. One-shot 54 is a negative edge-triggered device, whereby, a negative going signal transition (i.e., logic "1" to logic "0") from gate 50 causes one-shot 54 output signal $V_{OS1}$ to change from logic "0" to logic "1." Output signal $V_{OS1}$ remains a logic "1" for time duration $t_{OS1}$. The output of one-shot 54 is connected to a first input of NAND gate 52. NAND gate 52 comprises a two input NAND gate. A second input of NAND gate 52 is connected to converter enable/disable input 48. The output of NAND gate 52 is connected to a trigger input of one-shot 56 and also connected to an input of an inverting buffer 58. The output of one-shot 56 is connected to a first input of NAND gate 50. The output $V_{SW}$ of inverting buffer 58 is connected to switch means 18 via output 44.

Briefly described, the flyback converter 10 operates as follows, making reference to FIGS. 1 and 2. Assume that a charge enable signal on input 48 is received by the controlling means 42. Upon receipt of the enable signal, the controlling means 42 turns switching means 18 ON ($V_{SW}$ is HI) for a predetermined time $t_{ON}$ (FIG. 2c). With switching means 18 ON, current $I_P$ flows from the battery 20 through the primary winding 14 of the coupled inductors 12 (FIG. 2a) and energy is stored in the inductor primary 14. Current $I_P$ increases (FIG. 2a) in the inductor primary 14 approximately in accordance with the equation:

$$I_p = (V_{oc}/R_{tot})(1 - e^{-t/\tau}) + nI_{sMIN}e^{-t/\tau}$$

Where
$I_p$ is primary current;
$V_{oc}$ is open circuit power source voltage;
$R_{tot}$ is total series resistance of primary circuit including source internal resistance, switch transistor ON resistance, wiring resistance, and coil resistance;

t is the time measured from transistor turn ON;
$\tau$ is the effective R-L time constant,
$L_p/R_{tot}$, where $L_p$ is the value of the primary inductance;
n is the turns ratio of the coupled inductors;
$I_s$ is secondary current; and
$I_{sMIN}$ is the minimum secondary current threshold level.

Figure 2A:
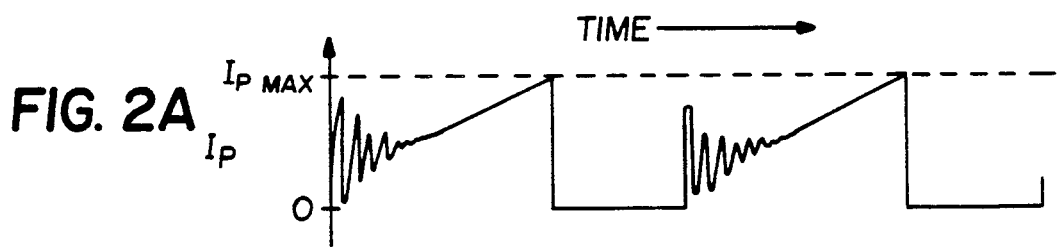
FIGS. 2a to 2d illustrate signal waveforms which exist at various points in the circuit diagram of FIG. 1.

After expiration of time $t_{ON}$, the controlling means 42 turns the switching means 18 OFF ($V_{SW}$ is LO) on output 44, whereby, current $I_P$ in the primary winding 14 is interrupted (FIG. 2a). Stored energy in the inductor primary 14 is then transferred to the secondary winding 16 and current $I_S$ (FIG. 2b) begins to flow. Current $I_S$ flows through secondary winding 16, diode 26, and storage capacitor 28, thus charging capacitor 28. When current $I_S$ in the secondary winding 16, sensed by the current sensing means 30, decreases below predetermined minimum threshold current level, $I_{MIN}$, current sensing means 30 output changes from a logic "0" to a logic "1". This output signal is received by input 46 of controlling means 42. The controlling means 42 then turns the switching means 18 ON again for time $t_{ON}$ and the charging cycle repeats.

Referring now to FIG. 2a, $I_{Pmax}$ is the peak primary winding current obtained during a single charging cycle. During operation of the converter 10, as the internal impedance 24 of the battery 20 increases, the peak primary current $I_{Pmax}$ will decrease accordingly in reference to the above given equation for $I_P$. By maintaining a fixed predetermined ON time $t_{ON}$ and having a non-zero secondary current threshold $I_{MIN}$, we have achieved a simpler circuit over the prior art for tracking the converter "load" to the power source internal impedance over the life of the power source. A discussion of energy transfer efficiency and battery life performance is found in commonly assigned U.S. Pat. No. 4,272,806.

Figure 2B:
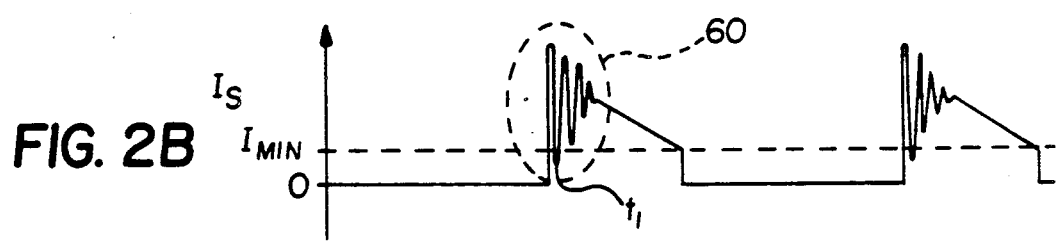
Figure 2C:
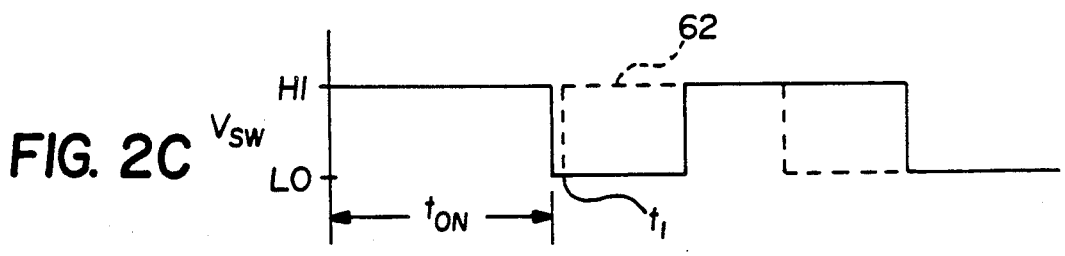
Figure 2D:
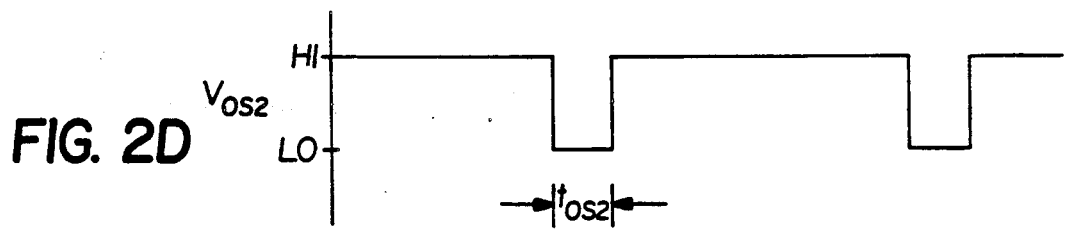

Upon termination of current $I_P$ in the inductor primary 14, current $I_S$ begins to flow in the inductor secondary 16. As shown in FIG. 2b, noise, indicated by numeral 60, is present in current $I_S$ due to reactive parasitic circuit elements, for example, a parasitic leakage inductance (not shown) of coupled inductor 12. Noise 60 makes controlling means 42 susceptible to prematurely activating switching means 18 via signal $V_{SW}$ as indicated in FIG. 2c by numeral 62. The premature activation would result from current sensing means 30 detecting current $I_S$ decreasing below the level of $I_{Smin}$ a time $t_1$ (FIG. 2b). The premature activation of switching means 18 would cause undesired deteriorated performance of converter 10. Drive controlling means 42 therefore includes a means for preventing such a premature activation of switching means 18, the preventing means comprising one-shot 56 connected to NAND gate 50.

Controlling means 42 operates as follows. NAND gate 50 receives three inputs, a first input from current sensing means 30. Assuming for the moment that the second and third inputs of NAND gate 50 are at logic "1" (HI), then the output of gate 50 is dependant upon the output of current sensing means 30. When the output of current sensing means 30 is logic "0" (LO), then the output of NAND gate 50 is logic "1" (HI). The output of current sensing means 30 is LO when secondary current $I_S$ is above $I_{MIN}$. Upon secondary current $I_S$ decreasing below $I_{MIN}$, the output of current sensing means 30 changes from logic "0" (LO) to logic "1" (HI) and the output of NAND gate 50 likewise changes from logic "1" (HI) to logic "0" (LO).

One-shot 54 receives, as input, the output of NAND gate 50. As previously mentioned, one-shot 54 is a negative edge-triggered device, whereby, a negative going signal transition (i.e., logic "1" to logic "0") from gate 50 causes one-shot 54 output signal $V_{OS1}$ to change from logic "0" to logic "1" for time duration $t_{OS1}$. Output signal $V_{OS1}$ is received as a first input of NAND gate 52. NAND gate 52 receives a second input from converter enable/disable input 48, which we have said for the moment is in a logic "1" state. When $V_{OS1}$ is in a logic "1" state and input 48 is in a logic "1" state, the output of NAND gate 52 is in a logic "0" or LO state. A LO state on the output of gate 52 is converted into a HI state on the output of inverting buffer 58. The output of inverting buffer 58 is the output 44 of controlling means 42. As we have mentioned previously, output 44 provides signal $V_{SW}$ to switching means 18. Signal $V_{SW}$ remains in the HI state for the time duration $t_{ON}$. During time duration $t_{ON}$, current $I_P$ flows in inductor primary 14 and no current flows in inductor secondary 16. The time duration of $t_{OS1}$ of the logic "1" pulse of output signal $V_{OS1}$ and subsequent time delays introduced by NAND gate 52 and inverting buffer 58 make up the time duration of $t_{ON}$ of signal $V_{SW}$.

Upon expiration of time $t_{OS1}$, output $V_{OS1}$ of one-shot 54 changes state from HI to LO, causing the output of NAND gate 52 to change from LO to HI, and causing the output of inverting buffer 58 (i.e., $V_{SW}$) to change from HI to LO. Switching means 18 is therefore deactivated (i.e., turned OFF). One-shot 56 is a positive edge-triggered one-shot device and has its input connected to the output of NAND gate 52. Upon the positive-edge transition from LO to HI of the output of gate 52, the output $V_{OS2}$ of one-shot 56 changes state, from HI to LO, remaining LO for time duration $t_{OS2}$. $V_{OS2}$ is the third input to NAND gate 50. The LO state in signal $V_{OS2}$ causes the output of NAND gate 50 to change from a LO state to a HI state and to remain HI for the time duration $t_{OS2}$. NAND gate 50 is therefor prevented from changing its output state during time duration $t_{OS2}$, that is, a HI to LO transition is prevented. As a result, noise 60 in current $I_S$ is prevented from prematurely triggering one-shot 54, and thus switching means 18. Such a premature trigger signal is shown in FIG. 2c as indicated by numeral 62, at the point in time indicated by $t_1$. Because of the LO presented by signal $V_{OS2}$ on the third input of NAND gate 50, the output of current sensing means 30 has no effect on the output of gate 50.

Time duration $t_{OS2}$ is selected to be longer than the time duration of noise 60. For example, noise 60 has been found to be approximately $200 \times 10^{-9}$ seconds in duration. Time, $t_{OS2}$, is thus selected to be longer than the time duration of noise 60, say for example, $450 \times 10^{-9}$ seconds.

The second input to NAND gate 50 is connected to controlling means input 48. Input 48 represents a converter enable/disable signal line. That is, when a logic "1" (HI) appears on input 48, drive controlling means 42 is enabled, NAND gate 50 receives a logic "1" at its second input, and the converter operates as previously discussed. When a logic "0" (LO) appears on input 48, drive controlling means 42 is disabled, NAND gate 50 receives a logic "0" (LO) at its second input, and converter 10 is disabled. A logic "0" on the second input of gate 50 inhibits gate 50 from changing its output, regardless of a HI or LO state on the first and third inputs.

As a result, converter 10 is effectively disabled. Enabling or disabling converter 10 is desirable to control the amount of voltage stored on capacitor 28. A voltage sensing means (not shown) on capacitor 28 could provide a HI or LO signal corresponding to the voltage on capacitor 28 being below or above a predetermined value, respectively.

Figure 3:
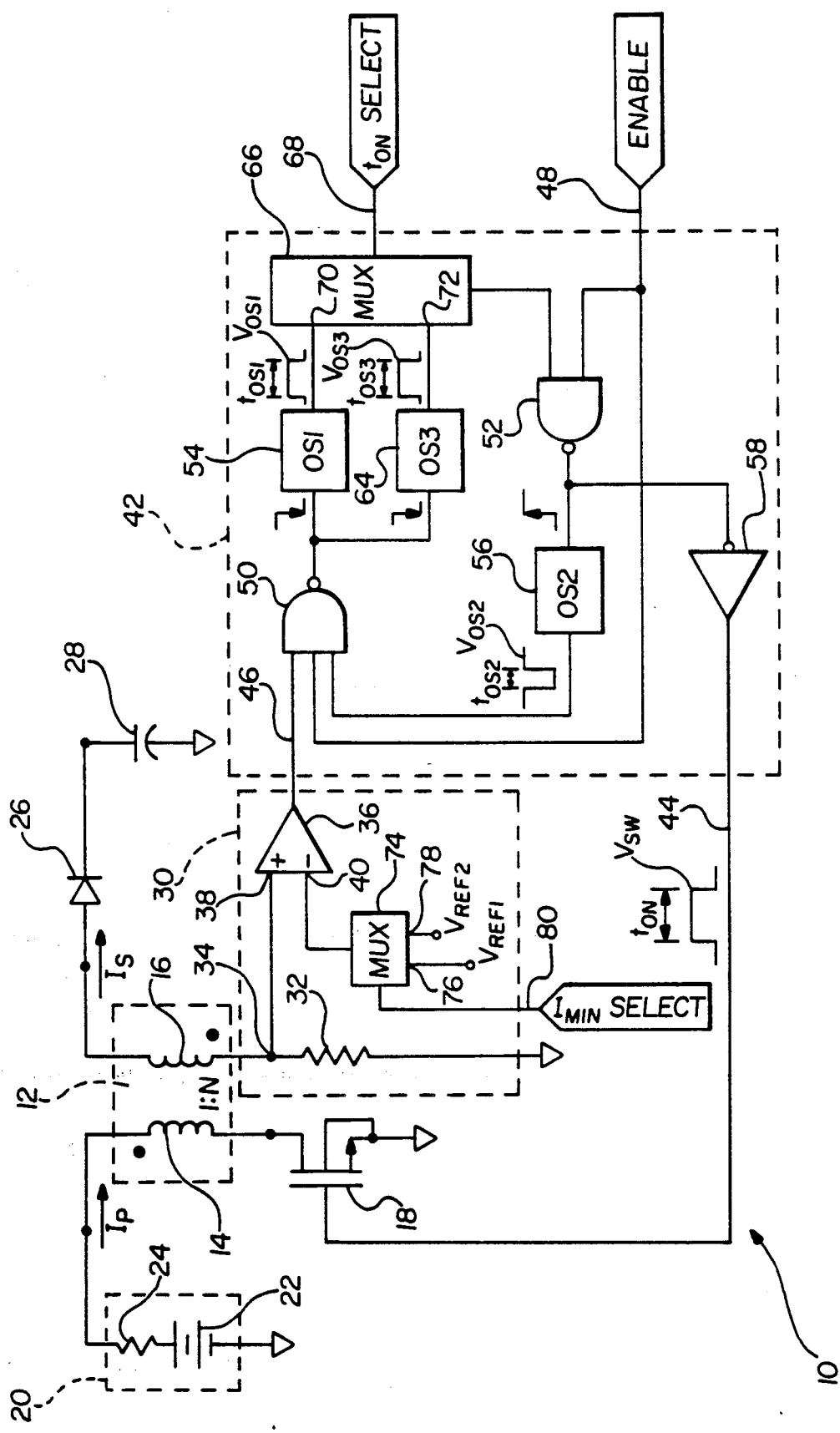
FIG. 3 is a circuit diagram of a DC-to-DC converter according to an alternate embodiment of the invention.

In an alternate embodiment shown in FIG. 3, DC-to-DC converter 10 is similar to that shown in FIG. 1 with the following differences. Controlling means 42 further includes one-shot 64, digital multiplexer (MUX) 66, and additional $t_{ON}$ select input 68. The output of NAND gate 50 is connected to the trigger inputs of both one-shot 54 and one-shot 64. One-shot 64 is a negative edge-triggered device, whereby, a negative going signal transition (i.e., logic "1" to logic "0") from gate 50 causes one-shot 64 output signal $V_{OS3}$ change from logic "0" to logic "1." Output signal $V_{OS3}$ remains a logic "1" for time duration $t_{OS3}$. Time duration $t_{OS3}$ corresponds to the ON time $t_{ON2}$ of output signal $V_{SW}$ of controlling means 42. Similarly, $t_{OS1}$ corresponds to the ON time $t_{ON1}$. Time duration $t_{OS3}$ ($t_{ON2}$) is longer than time duration $t_{OS1}$ ($t_{ON1}$), as will be discussed subsequently. The output of one-shot 54 is connected to a first input 70 of digital multiplexer 66. Likewise, the output of one-shot 64 is connected to a second input 72 of digital multiplexer 66. The output of digital MUX 66 is connected to the first input of NAND gate 52. Input 68 ($t_{ON}$ select) connects to a select input of digital MUX 66; whereby, a logic "0" (LO) on input 68 causes the output of one-shot 54 at first input 70 to appear on the output of MUX 66. Similarly, a logic "1" (HI) on input 68 causes the output of one-shot 64 at second input 72 to appear on the output of MUX 66. Although only two $t_{ON}$ selections have been shown, it is to be understood that a plurality of $t_{ON}$ selections may be implemented in a similar manner as described.

The current sensing means 30 of DC-to-DC converter 10, as shown in the alternate embodiment of FIG. 3, further includes an analog multiplexer 74 having first and second inputs 76 and 78, respectively. First and second inputs 76 and 78 are connected to reference voltages $V_{REF1}$ and $V_{REF2}$, respectively. Reference voltage $V_{REF1}$ corresponds to an $I_{MIN}$ current level of $I_{MIN1}$. Likewise, reference voltage $V_{REF2}$ corresponds to an $I_{MIN}$ current level of $I_{MIN2}$. Reference volta $V_{REF2}$ is greater than $V_{REF1}$, corresponding to $I_{MIN2}$ being greater than $I_{MIN1}$ as will be discussed subsequently. Current sensing means 30 further includes an $I_{MIN}$ select input 80. Input 80 connects to a select input of analog MUX 74; whereby, a logic "0" (LO) on input 80 causes $V_{REF1}$ to appear on the output of MUX 74. Similarly, a logic "1" (HI) on input 80 causes $V_{REF2}$ to appear on the output of MUX 74. The output of MUX 74 is connected to the inverting input 40 of comparator 36. Although only two $I_{MIN}$ selections have been shown, it is to be understood that a plurality of $I_{MIN}$ selections may be implemented in a similar manner as described.

The alternate embodiment of FIG. 3 operates similarly to the preferred embodiment of FIG. 1 with the following differences. Input 68 of controlling means 42 is used to select a predetermined ON time, $t_{ON1}$ or $t_{ON2}$. A logic "0" (LO) on input 68 selects $t_{ON1}$ whereas a logic "1" (HI) on input 68 selects $t_{ON2}$. The predetermined ON times, $t_{ON1}$ and $t_{ON2}$, can correspond to the type of battery or batteries used (e.g., $t_{ON1}$ for 3 volt (AA or AAA size) Alkaline batteries, $t_{ON2}$ for a 6 volt lithium battery, etc.). In this manner, the controlling means 42 and the converter 10 are easily adaptable for use with different types of batteries.

In a similar manner as noted above, the input 68 of controlling means 42 can be used to select one of several predetermined ON times, wherein, the ON times vary in duration (i.e., $t_{ON1}$ is less than $t_{ON2}$, etc.). In this manner, the ON time of the charge cycle can be varied within the lifetime of a particular battery (or set of batteries) in order to improve "late-life" charging performance. As a result, optimum performance of converter 10 can be achieved throughout the life of the battery.

The alternate embodiment of FIG. 3 further operates wherein input 80 of current sensing means 30 is used to select a predetermined minimum secondary current level, $I_{MIN1}$ or $I_{MIN2}$. A logic "0" (LO) on input 80 selects $I_{MIN1}$; whereas, a logic "1" (HI) on input 68 selects $I_{MIN2}$. The predetermined $I_{MIN}$ levels, $I_{MIN1}$ and $I_{MIN2}$, can correspond to the type of battery or batteries used (e.g., $I_{MIN1}$ for 3 volt (AA or AAA size) alkaline batteries, $I_{MIN2}$ for a 6 volt lithium battery, etc.). In this manner, converter 10 is easily adaptable for use with different types of batteries.

In a similar manner as noted above, the input 80 of current sensing means 30 can be used to select one of several predetermined $I_{MIN}$ levels, wherein, the $I_{MIN}$ levels correspond to different threshold levels (e.g., $I_{MIN1}$ is greater than $I_{MIN2}$, etc.). In this manner, the $I_{MIN}$ level of the charge cycle can be varied within the lifetime of a particular battery (or set of batteries) in order to improve "late-life" charging performance. As a result, optimum performance of the converter 10 can be achieved throughout the life of the battery.

There is thus provided a DC-to-DC converter which provides substantial advantages over the prior art, that is, a simple, cost effective, and high energy transfer efficient DC-to-DC converter. Furthermore, there is provided a DC-to-DC converter having improved battery life performance, improved charging performance, and high noise immunity. The high noise immunity further provides improved converter reliability.

While the invention has been particularly shown and described with respect to the certain preferred embodiments thereof, it will be understood by those skilled in the art that the foregoing and other changes in form and detail may be made therein without departing from the spirit and scope of the invention.

What is claimed is:

1. In a DC to DC converter adapted to be energized by a low-voltage DC power source, said converter including a coupled inductor having a primary winding and a secondary winding, and a switching means, in series with the primary winding and the energizing power source, for interrupting power source current to the primary winding to cause current to flow in the secondary winding, the converter comprising:

current sensing means, coupled to the secondary winding, for sensing current flow in the secondary winding, said current sensing means having (1) a first condition when the secondary winding current is below a predetermined level, and (2) a second condition when the secondary winding current is above the predetermined level; and means for controlling the switching means, having an input coupled to said current sensing means and an output coupled to said switching means, and having (1) a first state for a duration of a predetermined time upon a transition of said current sensing means from its second condition to its first condition, and (2) a second state when said current sensing means is in its second condition, the output of said controlling means and said switching means being coupled together so that power source current flows to the primary winding when said controlling means is in its first state and power source current is interrupted in the primary winding when said control means is in its second state.

2. A DC-to-DC converter as recited in claim 1, wherein said controlling means further comprising a means for preventing a premature occurrence of the first state subsequent to expiration of the predetermined time.

3. A DC to DC converter, adapted to be energized by a low-voltage DC power source, comprising:

coupled inductor means having a primary circuit means and a secondary circuit means for inducing a current in the secondary circuit means in response to current action in the primary circuit means;

switching means coupled to the primary circuit means for completing, when activated, a current path in the primary circuit means;

current sensing means coupled to said secondary circuit for sensing current in the secondary circuit, said current sensing means providing an output signal having a first condition when current in the secondary circuit decreases below a predetermined level and having a second condition when current in the secondary circuit is above the predetermined level; and means for controlling said switching means, having an input coupled to said current sensing means and having an output coupled to said switching means, said controlling means activating said switching means for a predetermined time upon the occurrence of the current sensing means output signal changing from the second condition to the first condition, and said controlling means deactivating said switching means when the predetermined time has expired.

4. A DC to DC converter as recited in claim 3, wherein said current sensing means further comprises means for selecting the predetermined level, the predetermined level being selectable from a plurality of predetermined levels.

5. A DC to DC converter as recited in claim 3, wherein said controlling means further comprises means for selecting the predetermined time, the predetermined time being selectable from a plurality of predetermined times.

6. A DC to DC converter as recited in claim 3, wherein said controlling means further comprises an enable input, said controlling means being enabled when a first signal condition is present on the enable input and said controlling means being disabled when a second signal condition is present on the enable input.

7. A DC to DC converter as recited in claim 3, wherein said controlling means further comprises a means for preventing a premature activation of said switching means subsequent to expiration of the predetermined time.

8. A DC to DC converter as recited in claim 7, wherein said current sensing means further comprises means for selecting the predetermined level, the predetermined level being selectable from a plurality of predetermined levels.

9. A DC to DC converter as recited in claim 7, wherein said controlling means further comprises means for selecting the predetermined time, the predetermined time being selectable from a plurality of predetermined times.

10. A DC to DC converter as recited in claim 7, wherein said controlling means further comprises an enable input, said controlling means being enabled when a first signal condition is present on the enable input and said controlling means being disabled when a second signal condition is present on the enable input.

11. A flyback type self-oscillating flash charger for use in an electronic flash device, adapted to be energized by a low-voltage DC power source, comprising:

a capacitor for storing an output voltage;

coupled inductor means having a primary winding and a secondary winding for inducing a current in the secondary winding in response to current action in the primary winding, the primary winding being coupled at a first end thereof to the low-voltage DC power source;

rectifying means coupled between the secondary winding and the capacitor for rectifying the current induced in the secondary winding to allow charging of the capacitor;

switching means coupled to the primary winding at a second end thereof for completing, when activated, a current path in the primary winding;

current sensing means coupled to said secondary winding for sensing current in the secondary winding, said current sensing means providing an output signal having a first condition when current in the secondary winding decreases below a predetermined level and having a second condition when current in the secondary winding is above the predetermined level; and means for controlling said switching means, having an input coupled to said current sensing means and having an output coupled to said switching means, said controlling means activating said switching means for a predetermined time upon the occurrence of the current sensing means output signal changing from the second condition to the first condition, and said controlling means deactivating said switching means when the predetermined time has expired.

12. A flyback type self-oscillating flash charger as recited in claim 11, wherein said current sensing means further comprises means for selecting the predetermined level, the predetermined level being selectable from a plurality of predetermined levels.

13. A flyback type self-oscillating flash charger as recited in claim 11, wherein said controlling means further comprises means for selecting the predetermined time, the predetermined time being selectable from a plurality of predetermined times.

14. A flyback type self-oscillating flash charger as recited in claim 11, wherein said controlling means further comprises an enable input, said controlling means being enabled when a first signal condition is present on the enable input and said controlling means being disabled when a second signal condition is present on the enable input.

15. A flyback type self-oscillating flash charger as recited in claim 11, wherein said controlling means further comprises a means for preventing a premature activation of said switching means subsequent to expiration of the predetermined time.

16. A flyback type self-oscillating flash charger as recited in claim 15, wherein said current sensing means further comprises means for selecting the predetermined level, the predetermined level being selectable from a plurality of predetermined levels.

17. A flyback type self-oscillating flash charger as recited in claim 15, wherein said controlling means further comprises means for selecting the predetermined time, the predetermined time being selectable from a plurality of predetermined times.

18. A flyback type self-oscillating flash charger as recited in claim 15, wherein said controlling means further comprises an enable input, said controlling means being enabled when a first signal condition is present on the enable input and said controlling means being disabled when a second signal condition is present on the enable input.

* * * * *